(No Model.)  4 Sheets—Sheet 1.
J. McALLISTER.
SAW FILING AND SETTING MACHINE.
No. 523,749.  Patented July 31, 1894.
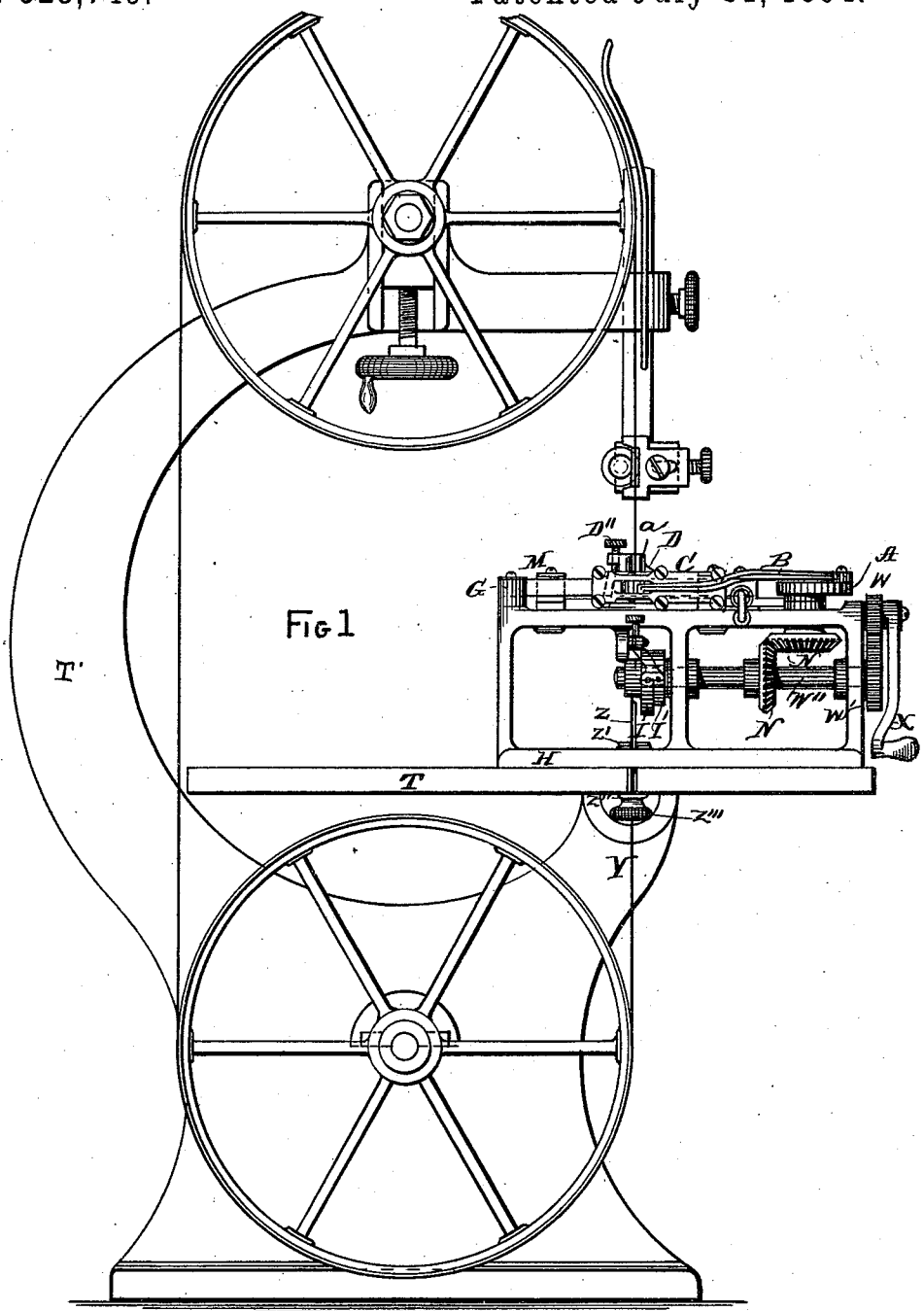
WITNESSES:
Jas. E. Warner
W. L. Isaacs
INVENTOR
John McAllister
BY H. L. Benner
his
ATTORNEY (No Model.) 4 Sheets—Sheet 2.
J. McALLISTER.
SAW FILING AND SETTING MACHINE.
No. 523,749. Patented July 31, 1894.
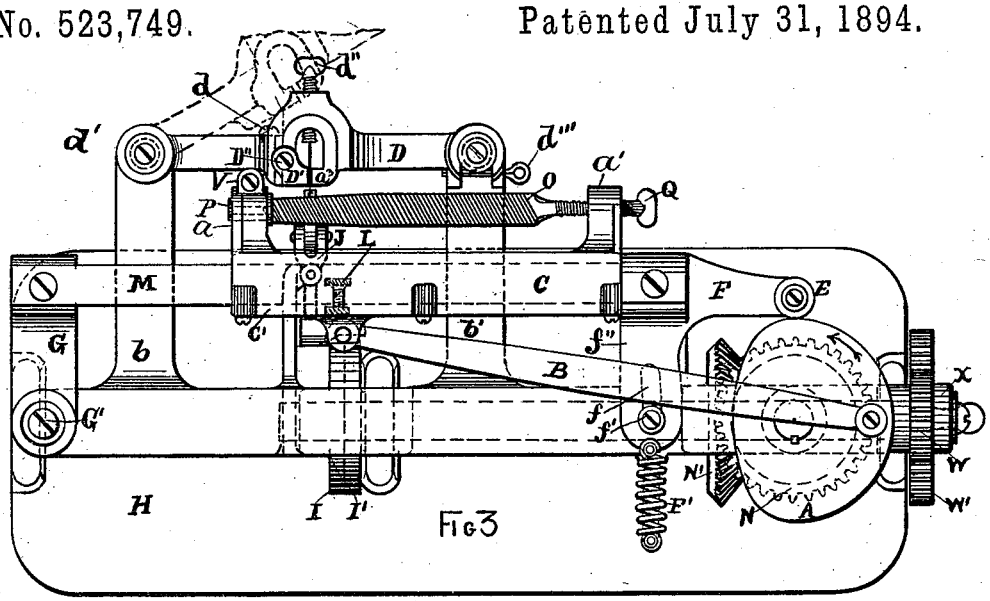
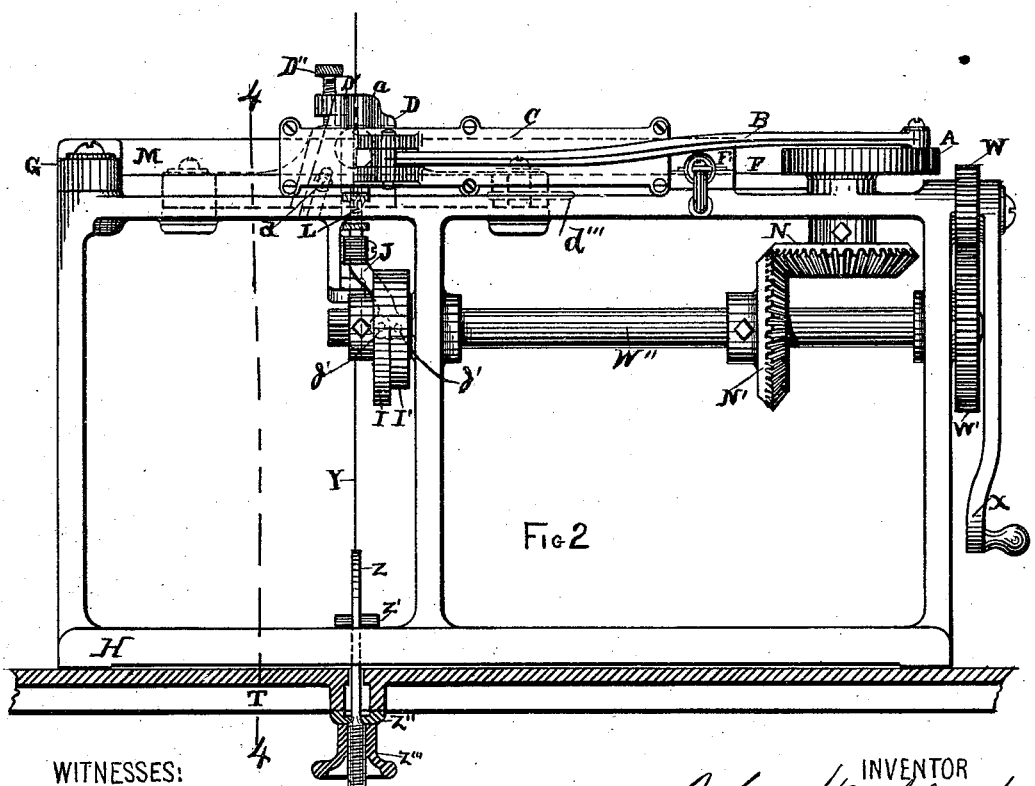
WITNESSES:
Jas. E. Warner
W. L. Isaacs.
INVENTOR
John McAllister
BY
W. L. Bennem
ATTORNEY (No Model.) 4 Sheets—Sheet 3.
J. McALLISTER.
SAW FILING AND SETTING MACHINE.
No. 523,749. Patented July 31, 1894.
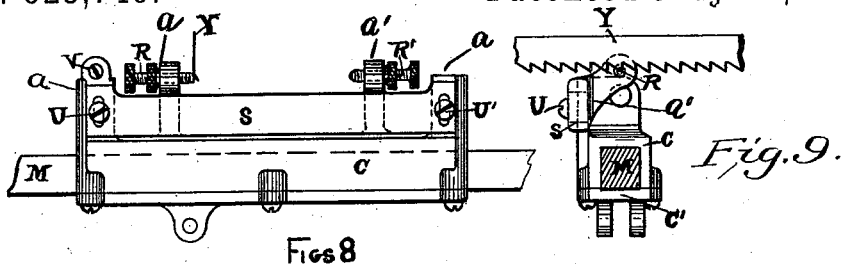
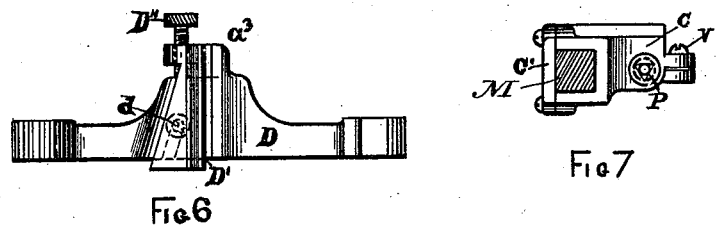
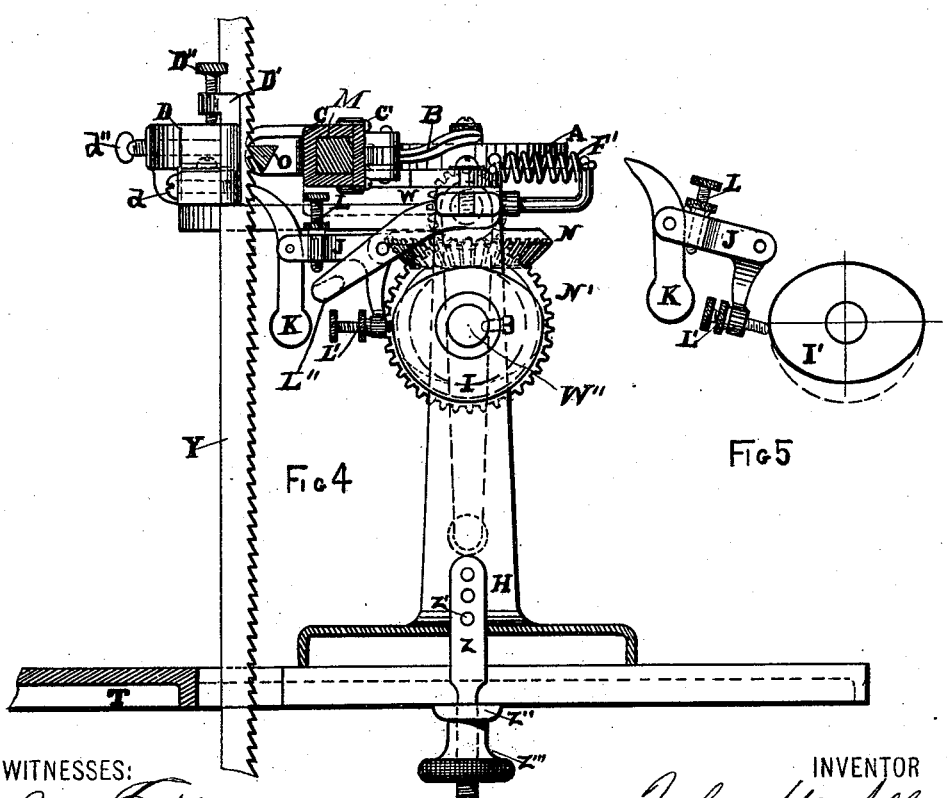
WITNESSES:
Jas. C. Warner
W. L. Isaacs
INVENTOR
John McAllister
BY
W. L. Benson
ATTORNEY (No Model.) 4 Sheets—Sheet 4.

J. McALLISTER.
SAW FILING AND SETTING MACHINE.

No. 523,749. Patented July 31, 1894.

WITNESSES:
Jas. E. Warner
W. L. Isaacs

INVENTOR
John McAllister
BY
W. L. Bennein
ATTORNEY

UNITED STATES PATENT OFFICE.

JOHN McALLISTER, OF BROOKLYN, NEW YORK, ASSIGNOR TO WILLIAM S. DOIG, OF SAME PLACE.

SAW FILING AND SETTING MACHINE.

SPECIFICATION forming part of Letters Patent No. 523,749, dated July 31, 1894.

Application filed November 15, 1893. Serial No. 491,053. (No model.)

*To all whom it may concern:*

Be it known that I, JOHN McALLISTER, a citizen of the United States, and a resident of Brooklyn, in the county of Kings and State of New York, have invented certain new and useful Improvements in Saw Filing and Setting Mechanism, of which the following is a specification.

This invention relates to machines adapted for filing and setting vertical or band saws and it consists in the construction and novel arrangement of parts as hereinafter specified and pointed out in the appended claims.

This machine is designed, when in use, to be rigidly attached to the saw table through which the saw operates and is so constructed that the file holder has a horizontal movement while filing the saw and a lateral movement to force the file from the saw upon the backward or return movement of the file.

Figure 10:
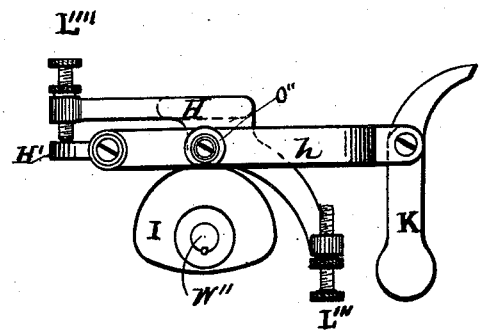
Figure 11:
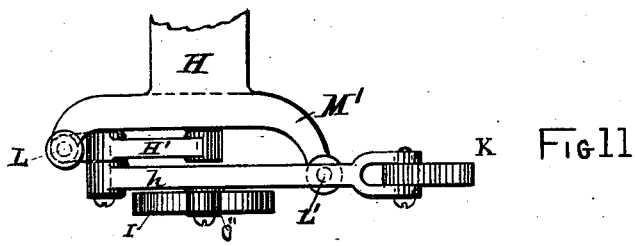
Figure 12:
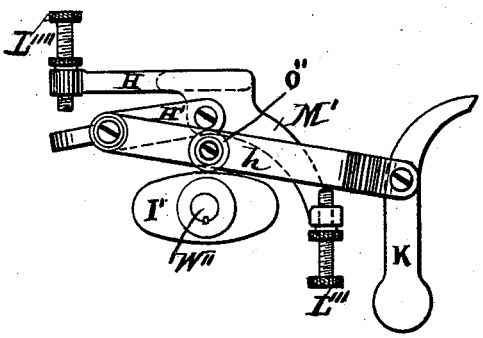

In the accompanying drawings, Figure 1, is a side elevation of a filing and setting device embodying my improvement, as attached to a saw table and operating upon the saw. Fig. 2, is a side elevation of the machine on an enlarged scale. Fig. 3, is a top plan view thereof. Fig. 4, is a section on the line 4, 4, of Fig. 2, showing the position of the parts during the filing of a saw. Fig. 5, is a detail showing a cam used during the setting of a saw. Fig. 6, is a view of the saw blade holder or vise. Fig. 7, shows a clamp and holder for one end of a file. Figs. 8, and 9, are side and end views of the saw setting mechanism. Fig. 10, is a side elevation of a modification showing a saw moving mechanism. Fig. 11, is a plan view, thereof, and Fig. 12, is a side elevation of saw moving mechanism, while setting, of modified construction.

Referring by letter to the drawings A, designates a cam carrying a crank pin mounted on the frame or support H, and designed to rotate in a horizontal plane. This cam carrying a crank pin is adapted to impart the necessary movements to a file and set carrier C, as will be hereinafter more fully explained.

The file and set carrier C, is movable longitudinally on a bar M, and it is held in place on said bar by means of the removable piece C'. The carrier C, has laterally extending arms $a$, $a$, at its opposite ends, one of which is provided with a socket or bush to receive the end of a file O, and the other one of which is provided with a set screw Q, to engage the end of the file.

The bar M, at one end has a pivotal connection with a link G, which is pivoted at G', to the frame H. The opposite end of the bar M, has a projection F, provided with a roller E, which bears on the cam A, and is held in connection therewith by means of a spring F', attached at one end to a lateral projection of the bar M, and at the other end, to the frame H, or to an arm extending therefrom. Obviously by the mechanism described the cam A, in its rotary movement will impart a lateral movement to the bar during its backward movement and remove the file from the saw. The carrier C, is reciprocated on the bar M, by means of the pin on the cam A, through the medium of a pitman B, engaging at one end with the carrier and at the other end with the pin as plainly shown. Motion is imparted to the cam through the medium of a bevel gear N, on the shaft of said cam, engaging with a bevel gear N', on a driving shaft W'', driven by a crank X, through gears W, W'.

The socket on bush P, is formed in jaws which are tightly clamped in the file O, by means of a screw V. After filing and it is desired to set the saw teeth, the file is removed and the setting device is attached to the laterally extending arms of the carrier C. This setting device comprises a set bar S, secured to and adjustable on the arms $a$, of the carrier C, by means of set screws U, U', passing through slots in the set bar and engaging with the arms $a$.

R, R', designate the set punches having screw-threaded exteriors engaging in tapped holes in lugs $a'$, extended from the set bar S. When the setting mechanism is in operation, there is only a back and forth movement imparted to the carrier C; that is, the lateral movement of the carrier is dispensed with, and therefore the roller E, must be moved and held out of engagement with the cam A. It may be held out of such engagement by means of a screw $f'$, passing through a slot $f$, in the lateral extension $f''$, of the bar M.

I will now describe the means for clamping a saw during filing or setting. It is to be understood that the clamping device is not intended to rigidly hold the saw, but merely to form abutments to prevent lateral movement of the saw.

D, indicates the clamp arm pivoted at one end, as at $d'$, to an arm $b$, extended from the frame H, and adapted to engage at the other end with a lug on an arm $b'$, extended from the frame and to be secured by means of a cotter $d'''$. The arm D, has a fixed jaw $a^3$, to bear against one side of the saw and a movable jaw D', to engage against the other side of the saw. The jaw D', is movable vertically, and is secured to the arm D, by means of a screw $d$, passing through an inclined slot in a portion of the jaw, and the jaw is clamped against the saw by means of the set screw D''. A screw $d''$, may be adjusted against the back edge of the saw blade.

I will now describe the mechanism for moving the saw tooth by tooth during the operation of filing or setting. It is to be understood that while filing the saw is to be moved vertically through the space of one tooth during the backward movement of the file and that while setting the teeth the saw is to be moved during each movement of the setting mechanism.

J, designates a bell-crank lever pivoted to the frame H, and carrying at one end a weighted swinging dog K, adapted to engage with the saw teeth as plainly shown in Fig. 4. The other end of the bell-crank lever is provided with tapped holes, to receive a tappet L', made in the form of a screw, so that it may be adjusted for the proper length of movement of a saw or for saws of different sized teeth. A set screw L, co-acting with a stop L'', is employed to adjust the degree of fall or downward movement of the dog K.

I, I', shows cams on the shaft W'', and with which the tappet L', is designed to respectively engage. The cam I, is designed to operate the dog K, to move the saw Y, during the filing of the same, and therefore is so formed as to impart but one movement thereof during an entire rotary movement of the cam. The cam I', is designed to move the saw while setting the teeth and is, therefore, so formed (elliptical) as to impart two movements to the saw by one rotary movement of the cam.

Referring now to the modifications shown in Figs. 10, 11 and 12, for moving the saw during filing or setting, it must be understood that instead of both cams I, I', being on the drive shaft, only one cam at a time is placed thereon, as the case may require; and in this case, I dispense with the movable tappet L'. In these figures, M', shows a double arm bracket, extended from the frame H. H', is a link having a pivotal connection at one end with the bracket and at the other end with a vertically swinging lever $h$, which at its outer end has a pivotal connection with the dog K. An anti-friction roller $o''$, on a stud extending from the lever $h$, engages with either one of the cams I, or I', that may be in use. An adjustable stop L''' serves to limit or adjust the downward movement of the lever and an adjustable stop L'''', serves to limit the upward movement thereof.

My invention may be attached to the table T, of a band saw machine by means of a bolt Z, passing through a slotted hole in the frame H, and a table T, and a thumb nut Z''', engaging the screw-threaded end of the bolt. The bolt, if desired, may be provided with a series of holes through which a pin Z', may pass and form a head to bear upon the upper side of the frame H. This construction is to adjust the bolt to different thicknesses of tables. A washer Z'', may be interposed between the nut Z''', and the table as shown.

In filing a saw the operation is as follows: The saw blade Y, is clamped in position as before described, then by turning the crank X, the file O, will be moved forward over a tooth and file it, and during its backward movement the saw will be raised one tooth by the mechanism described.

In setting the teeth, the file is removed, the roller E, moved away from the cam A, and the setting device placed on the carrier, which may now be set in motion. In its forward movement the set punch R', will set a tooth laterally, then by the backward movement, the saw will be moved one tooth and the set punch R, will set the tooth or bend it laterally opposite the preceding tooth.

Having described my invention, what I claim is—

1. In a machine of the class described, the combination with a movable carrier and operating mechanism, mechanism for feeding the saw vertically, comprising a pivoted bell-crank lever, a dog, having an integral weight pivoted to one end of said lever and adapted to engage directly with the saw teeth, a tappet adjustably engaged with said lever, means for regulating the movement of the dog and a cam with which the tappet engages, substantially as specified.

2. In a machine of the class described the combination with a frame of clamping means comprising an arm having pivotal connection with said frame, a fixed jaw on said arm; the vertically movable jaw having the inclined slot, a screw passing through said slot and engaging with the arm and the clamping screw, substantially as specified.

3. In a machine of the class described, the combination with a frame or support of a cam carrying a crank pin mounted on said frame or support and adapted to rotate in a horizontal plane, the file and set carrier movable on bar M. the link having pivotal connection with the bar and frame, a roller on said bar adapted to bear upon the cam, and the connection between the carrier and the crank pin, substantially as specified.

4. In a machine of the class described, the combination with a frame or support of the bar M. having a pivotal connection at one end with said frame or support, a roller at the opposite end of said bar, a cam with which said roller engages for moving the bar laterally in one direction a spring for moving it in the opposite direction and the carrier movable on said bar, substantially as described.

5. In a machine of the class described, the combination with a frame or support, of the bar having a pivotal connection at one end with said bar, a roller on the opposite end of said bar, a slotted part extended from said bar, a screw passing through said slot and engaging with the frame or support, a cam having a crank pin, a carrier on said bar and a connection between the carrier and crank pin whereby the said carrier may be reciprocated on the bar, substantially as specified.

In testimony that I claim the foregoing as my invention I have signed my name, in presence of two witnesses, this 14th day of November, 1893.

JOHN McALLISTER.

Witnesses:
  WILLIAM S. DOIG,
  GEO. B. CLAFLIN.